Nov. 9, 1971 W. ROTTWEILER 3,618,411
PULLEY
Filed Dec. 4, 1969
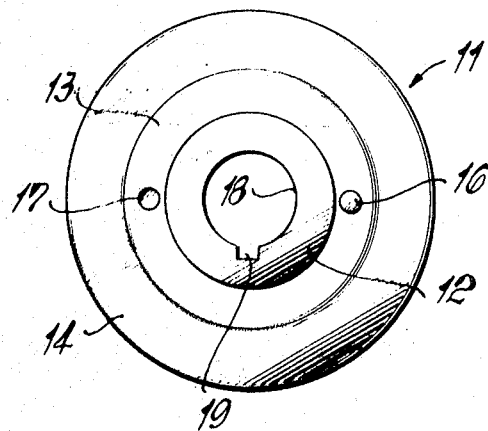
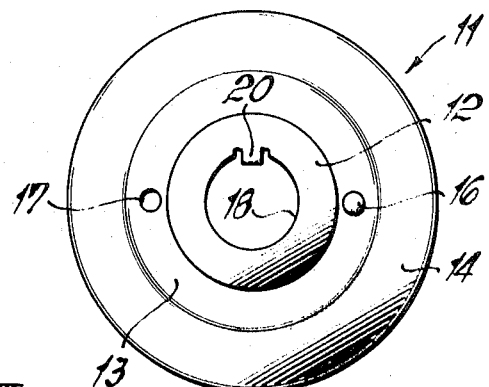
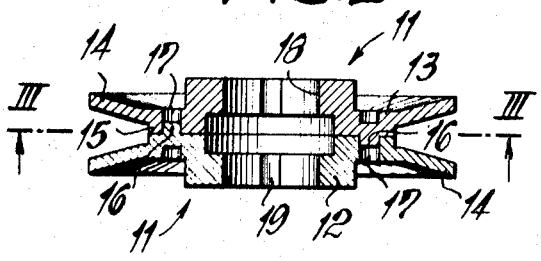
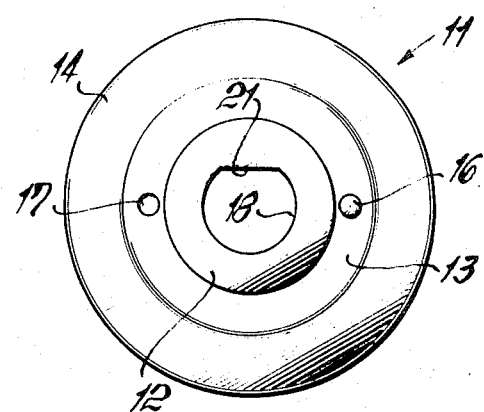
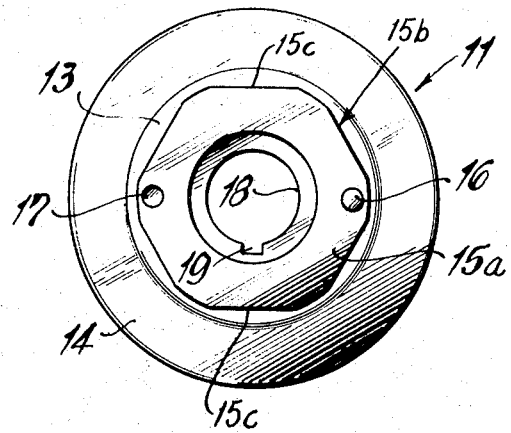
INVENTOR
Willy ROTTWEILER
BY
his ATTORNEY

United States Patent Office 3,618,411
Patented Nov. 9, 1971

3,618,411
PULLEY
Willy Rottweiler, Stuttgart-Feuerbach, Germany, assignor to Robert Bosch GmbH, Stuttgart, Germany
Filed Dec. 4, 1969, Ser. No. 882,100
Claims priority, application Germany, Dec. 7, 1968,
P 18 13 427.5
Int. Cl. F16h 55/46
U.S. Cl. 74—230.11                                      12 Claims

ABSTRACT OF THE DISCLOSURE

Two identical pulleys halves are mirror-symmetrically arranged relative to each other and each comprises an annular hub portion having an annular axial projection on its inner end face, and a flange portion projecting outwardly from the hub portion and with the respective flange portions axially inclined in direction away from each other. The annular projections are abuttingly connected to each other and together define an outer circumferential surface which is located intermediate and within the confines of the two flange portions and has at least one flat facet whose general plane is at least substantially parallel with the axis of the pulley.

BACKGROUND OF THE INVENTION

The present invention relates to a pulley especially for use for driving electric generators of motor vehicles.

Many types of such pulleys are known and, predominantly, they used to be made from a rolled, forged or molded material and were given their final form by means of material removing machining.

Lately, however, these type pulleys, for reasons of economical manufacturing, are formed by at least two stamped and drawn sheet metal sections which are connected to each other, e.g. by means of rivets. In order to mount this latter type pulley on a drive shaft, the respective sections may either be integrally formed with or loosely arranged with a thick-walled center section, for example, a turned section.

Also known are pulleys which consist of only one stamped, drawn and pressed sheet metal portion which is mounted on the drive shaft by means of a thick-walled center section which is either loosely attached or fixedly connected to the sheet metal portion by means of solder connections, screw connections or rivet connections.

The pulleys are mounted on the drive shaft stub which, usually, is provided with a collar or flange against which the pulleys are pressed and seated. Upon mounting the pulley on the shaft, a tightening nut is screwed on the threaded end of the shaft and presses and retains the pulley in engagement with the collar or flange on the shaft. The friction coupling produced by the tightened nut, generally, is sufficient to permit driving of the generator shaft by the pulley.

For safety, and other reasons, an additional coupling usually is made between the pulley and the drive shaft by means of a key and key way or a groove-and-tongue connection, e.g. a woodruff key connection.

The main purpose of such an additional coupling between the pulley and the drive shaft is to avoid rotation of the generator shaft during tightening and loosening of the nut. Hitherto, such rotation was prevented by manually blocking of the pulley which was done either directly or indirectly by blocking the drive belt connected to the pulley.

In case the drive belt is not attached to the pulley, the latter itself has to be held against rotation either by hand or with the help of a suitable tool in order to permit tightening or loosening of the nut. In doing so, however, especially those pulleys made from sheet metal and thus having an overall thin-walled construction, can easily be bent and damaged which renders such pulleys unfit for further use.

The steadily increasing use of electrical energy in motor vehicles requires a constant increase in magnitude and strength of the generators which have to produce this energy. Consequently, an increase in the drive capacity for driving the generators is necessary, which, among other things, requires an increase of the belt tension of the generator belt.

In addition, the increase in required power output of certain auxiliary drives, also driven by the generator belt, further requires increased drive belt tensions.

However, increased drive belt tension tends to press the respective wedge-shaped rims of the pulley away from each other, as a result of which higher demands are made of the form rigidity of these rims.

In addition, pulleys consisting of one or more sheet metal parts and additional loosely attached components such as hubs and spacers, have the disadvantage that they have to be united on the shaft which complicates the assembly and positioning of such pulleys which, obviously, is rather uneconomical.

SUMMARY OF THE INVENTION

Object of the present invention is to overcome the above disadvantages and to provide a one-piece pulley which, as a result of its shape, is conveniently held against rotation during tightening and loosening of the tightening nut; which, also during increased tension of the drive belt, has an invariable form rigidity; and which, moreover, is economical as regards its manufacturing.

Such a pulley according to the invention comprises two identical pulley halves which are mirror symmetrically arranged relative to each other and each comprising an annular hub portion having an annular axial projection on its inner end face, and a flange portion projecting outwardly from the hub portion and with the respective flange portions axially inclined in direction away from each other. The annular projections are abuttingly connected to each other and together define an outer circumferential surface which is located intermediate and within the confines of the two flange portions and has at least one flat facet whose general plane is at least substantially parallel with the axis of the pulley.

The novel features which are considered as characteristic of the invention are set forth in particular in the appended claims. The improved pulley itself, however, both as to its construction and its mode of operation, together with additional features and advantages thereof, will be best understood upon perusal of the following detailed description of certain specific embodiments with reference to the acompanying drawings.

BRIEF DESCRIPTION OF THE DRAWINGS

FIG. 1 illustrates a plan view of the pulley according to the present invention and incorporating a key way operative for receiving a key on the drive shaft on which the pulley is mounted and held against rotation relative thereto;

FIG. 2 shows a cross-sectional elevation of the pulley of FIG. 1;

FIG. 3 shows a plan view of half of the pulley of FIG. 2 and as seen in the direction III, FIG. 2;

FIG. 4 illustrates a plan view of the pulley of FIG. 1, however, instead of a key way, incorporating a locking tongue operative to be accommodated in a key way or slot on drive shaft on which the pulley is mounted; and FIG. 5 illustrates a plan view of the pulley of FIG. 4, however, instead of a locking tongue, incorporating a flat facet operative to cooperate with a corresponding facet on the drive shaft to hold the pulley against rotation thereon.

DESCRIPTION OF THE PREFERRED EMBODIMENTS

The pulley shown in FIGS. 1–3, consists of two identical halves 11 which are mirror-symmetrically combined together.

Each of the halves 11 is seen to comprises an annular hub portion 12, a disc portion 13, and a flange portion 14 extending outwardly from disc portion 13. As shown in FIG. 2, the respective flange portions 14 are axially inclined in direction away from each other.

Each of the halves 11, has an annular axial projection 15 which, as shown in FIG. 3, has an end face 15a abutting against the end face of the other half and an outer circumferential surface 15b which has the configuration substantially of a hexagon in which diametrically opposite edges are blunted and with each two flat facets 15c of the hexagon extending diametrically opposite one another and at least substantially parallel with the axis of the pulley.

The hexagonal outer circumferential surface 15b, as shown, extends intermediate and within the confines of the inner ends of the flange portions 14 and thus is easily accessible and permits easy engagement with a wrench member to retain the pulley in any of six positions during tightening or loosening of the tightening nut which retains the pulley on a shaft.

Each one of the pulley halves 11 is seen to further comprise an embossed pin member 16 extending outwardly from each of the axial end faces 15a and a through-bore 17 extending through each of the halves 11 and at an angle of 180° relative to the pin member 16.

As shown, the pin member 16 and the through-bore 17 extend at opposite sides of the central axial opening 18 which serves to permit mounting of the pulley on a drive shaft, not shown.

The pin member 16 and the through-bores 17 are arranged so that the pin member of one half 11 is axially received in a corresponding through-bore of the other of the halves 11.

The through-bores 17 have an inner diameter slightly larger than the diameter of the pin members 16 and the latter are upset in the through-bores 17 so as to retain the former in the latter to thereby connect the two halves 11 together.

In order to retain the pulley against rotation on the drive shaft, not shown, on which it is mounted, the pulley is provided with a coupling member which cooperates with auxiliary conventional coupling means on the drive shaft.

The coupling member shown in FIG. 1, is a key way 19 provided in the circumferential surface 18a of the opening 18. The key way 19 is operative to accommodate a wedge or a key on the drive shaft on which the pulley is mounted and thus secures the pulley against rotation on a drive shaft. The key, of course, may be of whatever desired construction, including a woodruff-key.

The coupling member of the pulley shown in FIG. 4 constitutes a radially inwardly extending tongue 20 projecting from the circumferential surface 18a of the opening 18. The tongue 20 is operative to be accommodated in a longitudinal groove or nut which is formed in the drive on which the pulley is to be mounted and extends along the entire elongation of the shaft.

In this manner, the pulley arrangement of FIG. 4, which other than the tongue 20 is identical with the pulley shown in FIGS. 1–3, is secured against rotation on the drive shaft.

The coupling member of the pulley shown in FIG. 5 constitutes a flat facet 21 in the circumferential surface 18a of the opening 18 and is operative to engage a correspondingly shaped facet on the drive shaft on which the pulley is to be mounted. The advantage of this conventional type coupling is less wear and tear of the machining tools during production of the pulley, and, of course, a greater economy by doing away with the key way arrangement of FIGS. 1–3, on the one hand, and the tongue arrangement of FIG. 4, on the other hand.

Also, the arrangement with the flat facet 21 is less subject to trouble as compared with the tongue 20 which is easily subject to damage inflicted thereon, or the key and key way arrangement in that if a loose key member is used to retain the pulley against rotation, such key member can easily be lost.

The embodiments of the pulleys as shown in FIGS. 1–5, all have the advantage (1) that they can easily and economically be manufactured and marketed as a one-piece member, (2) that the arrangement with the annular axial projections intermediate the hub portions reinforce the structure of the pulley which, as a result, attains a higher form rigidity which is suitably maintained during increased tension of the drive belt which links the drive shaft pulley with the pulley of the electric generator, and (3) that during loosening or tightening of the nut which retains the pulley on the shaft, the pulley can be conventionally held in six different positions simply by engaging the hexagonal outer circumferential surface of the pulley with a wrench member.

It will be understood that each of the elements described above, or two or more together, may also find a useful application in other types of pulleys differing from the types described above.

While the invention has been illustrated and described as embodied in the respective figures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A pulley, especially for mounting on a shaft of an electric generator, comprising, in combination, first and second identical annular elements arranged mirror symmetrical with respect to each other, each of said elements comprising a hub portion, a disc portion surrounding said hub portion and an annular flange portion projecting outwardly from said disc portion and axially inclined in direction away from the flange portion of the other element, said hub portion and said disc portion of each element forming an annular axial projection projecting axially beyond the flange portion of the respective element and having a common end face abutting against the end face of the annular projection of the other element, said axial projections defining together an outer circumferential surface located intermediate said flange portions and having at least one flat facet extending substantially parallel to the axis of said hub portion; connecting means integral with and connecting said elements to each other; and arresting means for preventing rotation of said pulley with respect to a shaft on which it is adapted to be mounted.

2. A pulley as defined in claim 1, wherein said outer circumferential surface comprises two flat facets arranged diametrically opposite each other and at least substantially parallel with the axis of said hub portions.

3. A pulley as defined in claim 1, wherein said outer circumferential surface comprises six flat facets each two of which extending diametrically opposite each other and at least substantially parallel with the axis of said hub portions.

4. A pulley as defined in claim 1, wherein said connecting means comprises at least one pin member and bore associated with each of said end faces and with the pin member of one end face accommodated and retained in a corresponding bore in the other end face.

5. A pulley as defined in claim 4, wherein said at least one pin member and bore of each of said end faces are offset relative to the axis of said hub portions and are radially spaced relative to each other.

6. A pulley as defined in claim 5, wherein said pin members extend outwardly from said end faces and said bores extend through both said hub portions and said projections, said bores having a diameter slightly larger than the diameter of said pin members and with the latter being upset in said bores.

7. A pulley as defined in claim 5, wherein said at least one pin member and bore of each of said end faces are spaced through 180° relative to each other.

8. A pulley as defined in claim 1, wherein said hub portions and said projections together define a central axial opening having an inner circumferential surface concentric with said outer circumferential surface, said comprising arresting means being provided on said inner circumferential surface and adapted for cooperative engagement with complementary arresting portions provided on a shaft which is receivable in said central axial opening to thereby prevent rotation of the pulley with reference to such shaft.

9. A pulley as defined in claim 8, wherein said arresting means comprises an axially extending key way in said inner circumferential surface of said central opening.

10. A pulley as defined in claim 8, wherein said arresting means comprises an axially extending tongue radially inwardly projecting from said inner circumferential surface of said central opening.

11. A pulley as defined in claim 8, wherein said arresting means comprises an axially extending flat facet in said inner circumferential surface of said central opening.

12. A pulley as defined in claim 4, wherein said at least one pin member is integral with and projects from said end face of said disc portion and is constituted by an upset portion of said disc portion.

References Cited

UNITED STATES PATENTS

| | | | |
|---|---|---|---|
| 1,457,130 | 5/1923 | Yale | 74—230.11 |
| 2,922,310 | 1/1960 | Anderson | 74—230.3 |
| 3,367,199 | 2/1968 | Dankowski | 74—230.3 |

CORNELIUS J. HUSAR, Primary Examiner